(12) United States Patent
Kondo

(10) Patent No.: US 11,489,986 B2
(45) Date of Patent: Nov. 1, 2022

(54) MULTIFUNCTION PERIPHERAL, CONTROL METHOD THEREOF, AND STORAGE MEDIUM STORING PROGRAM

(71) Applicant: BROTHER KOGYO KABUSHIKI KAISHA, Nagoya (JP)

(72) Inventor: Tomoya Kondo, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 29 days.

(21) Appl. No.: 17/073,794

(22) Filed: Oct. 19, 2020

(65) Prior Publication Data

US 2021/0138796 A1    May 13, 2021

(30) Foreign Application Priority Data

Nov. 7, 2019 (JP) .............................. JP2019-202015

(51) Int. Cl.
*B41J 29/393* (2006.01)
*H04N 1/409* (2006.01)
*B41J 2/21* (2006.01)
*H04N 1/60* (2006.01)
*H04N 1/00* (2006.01)

(52) U.S. Cl.
CPC .......... *H04N 1/4097* (2013.01); *B41J 2/2142* (2013.01); *B41J 29/393* (2013.01); *H04N 1/00015* (2013.01); *H04N 1/00045* (2013.01); *H04N 1/00082* (2013.01); *H04N 1/00092* (2013.01); *H04N 1/6033* (2013.01); *B41J 2029/3935* (2013.01); *B41J 2203/01* (2020.08)

(58) Field of Classification Search
CPC .............. B41J 29/393; B41J 2029/3935; B41J 2/2142; B41J 2203/01; H04N 1/00045; H04N 1/00092; H04N 1/6033; H04N 1/4097
See application file for complete search history.

(56) References Cited

U.S. PATENT DOCUMENTS

2017/0087910 A1    3/2017  Nagashima
2017/0144463 A1*   5/2017  Kyoso .................... B41J 29/393
2017/0195500 A1*   7/2017  Sugimoto .......... H04N 1/00023

FOREIGN PATENT DOCUMENTS

JP       2000-147862 A    5/2000
JP       2017-064979 A    4/2017

* cited by examiner

*Primary Examiner* — Julian D Huffman
(74) *Attorney, Agent, or Firm* — Scully, Scott, Murphy & Presser, P.C.

(57) ABSTRACT

A multifunction peripheral includes a conveyance roller, a print engine, a scanner, and a controller. The controller is configured to perform: driving the conveyance roller to convey a recording medium and controlling the print engine to record, on the recording medium, a test image based on test image data with recording agent; after recording the test image, controlling the scanner to generate scan data of the test image recorded on the recording medium; after generating the scan data, extracting, based on the scan data and the test image data, stain data indicative of a stain caused by transfer of the recording agent from the conveyance roller to the recording medium; after extracting the stain data, generating correction data by removing the stain data from the scan data; and executing particular processing by using the correction data.

15 Claims, 11 Drawing Sheets

MULTIFUNCTION PERIPHERAL, CONTROL METHOD THEREOF, AND STORAGE MEDIUM STORING PROGRAM

CROSS REFERENCE TO RELATED APPLICATIONS

This application claims priority from Japanese Patent Application No. 2019-202015 filed Nov. 7, 2019. The entire content of the priority application is incorporated herein by reference.

TECHNICAL FIELD

This disclosure relates to a multifunction peripheral, a control method thereof, and a storage medium storing a program.

BACKGROUND

It is disclosed that a test chart is printed on paper and processing such as noise detection is executed based on the read data of the test chart.

SUMMARY

According to one aspect, this specification discloses a multifunction peripheral. The multifunction peripheral includes a conveyance roller, a print engine, a scanner, and a controller. The controller is configured to perform: driving the conveyance roller to convey a recording medium and controlling the print engine to record, on the recording medium, a test image based on test image data with recording agent; after recording the test image, controlling the scanner to generate scan data of the test image recorded on the recording medium; after generating the scan data, extracting, based on the scan data and the test image data, stain data indicative of a stain caused by transfer of the recording agent from the conveyance roller to the recording medium; after extracting the stain data, generating correction data by removing the stain data from the scan data; and executing particular processing by using the correction data.

According to another aspect, this specification also discloses a control method of controlling a multifunction peripheral including a conveyance roller, a print engine, and a scanner. The control method includes: driving the conveyance roller to convey a recording medium and controlling the print engine to record, on the recording medium, a test image based on test image data with recording agent; after recording the test image, controlling the scanner to generate scan data of the test image recorded on the recording medium; after generating the scan data, extracting, based on the scan data and the test image data, stain data indicative of a stain caused by transfer of the recording agent from the conveyance roller to the recording medium; after extracting the stain data, generating correction data by removing the stain data from the scan data; and executing particular processing by using the correction data.

According to still another aspect, this specification also discloses a non-transitory computer-readable storage medium storing a program including computer-readable instructions for a multifunction peripheral including a conveyance roller, a print engine, and a scanner. The computer-readable instructions, when executed by a controller of the multifunction peripheral, cause the multifunction peripheral to perform: driving the conveyance roller to convey a recording medium and controlling the print engine to record, on the recording medium, a test image based on test image data with recording agent; after recording the test image, controlling the scanner to generate scan data of the test image recorded on the recording medium; after generating the scan data, extracting, based on the scan data and the test image data, stain data indicative of a stain caused by transfer of the recording agent from the conveyance roller to the recording medium; after extracting the stain data, generating correction data by removing the stain data from the scan data; and executing particular processing by using the correction data.

BRIEF DESCRIPTION OF THE DRAWINGS

Embodiments in accordance with this disclosure will be described in detail with reference to the following figures wherein.

DETAILED DESCRIPTION

In a configuration in which paper is conveyed by a conveyance roller, it is considered that ink on the paper is transferred to the conveyance roller, and the ink is further re-transferred from the conveyance roller to paper (an upstream portion of the paper in the conveyance direction or another paper). In this case, the acquired read data (scan data) of the test chart (test image) may include stain data due to transfer. If processing such as noise detection is executed based on such read data, a problem may arise that proper processing cannot be executed due to erroneous detection and so on.

In view of the foregoing, an example of an objective of this disclosure is to provide a multifunction peripheral configured to execute appropriate processing based on read data (scan data) of a test image, a control method thereof, and a storage medium storing a program.

First Embodiment

Figure 1:
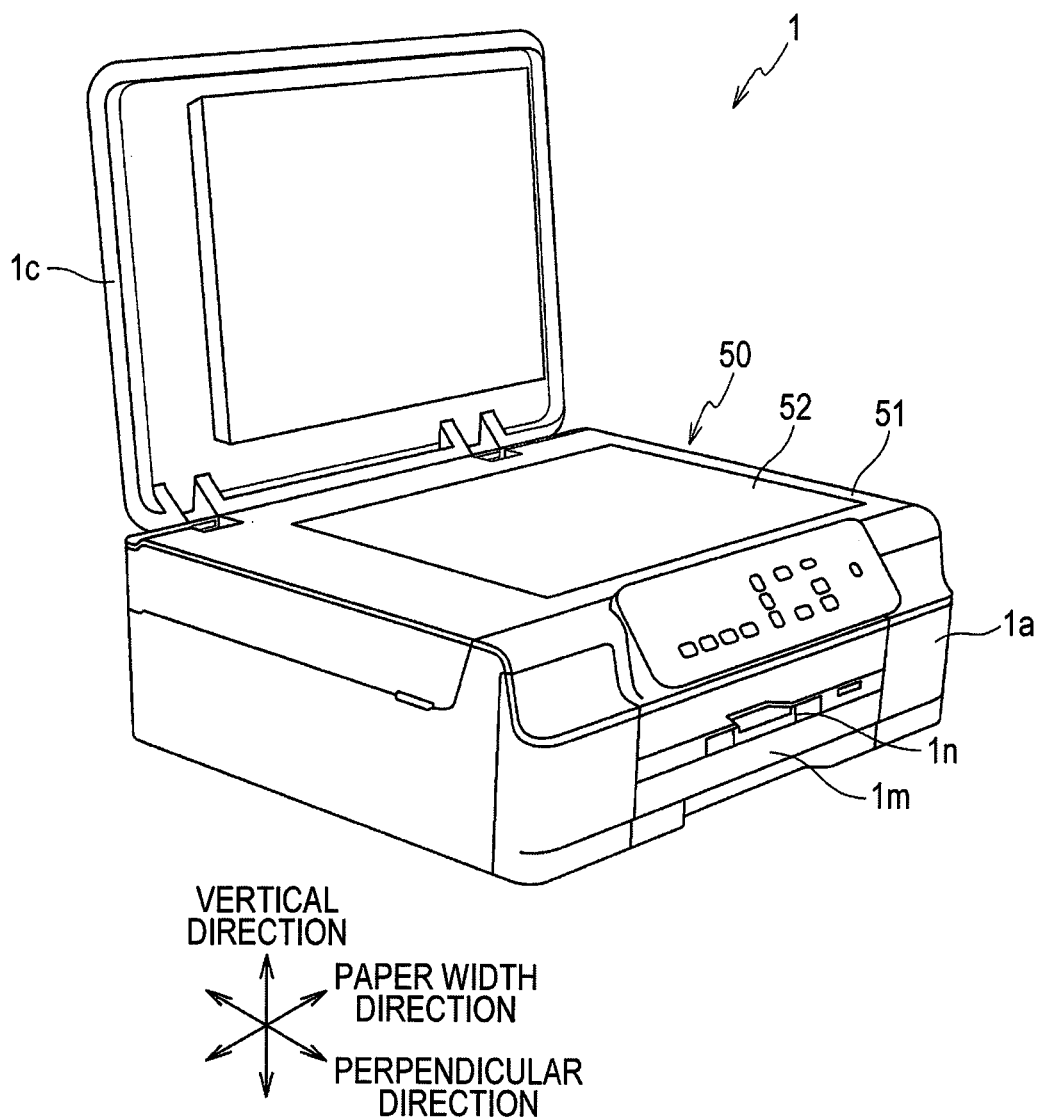
FIG. 1 is a perspective view showing a multifunction peripheral according to a first embodiment of this disclosure.
Figure 2:
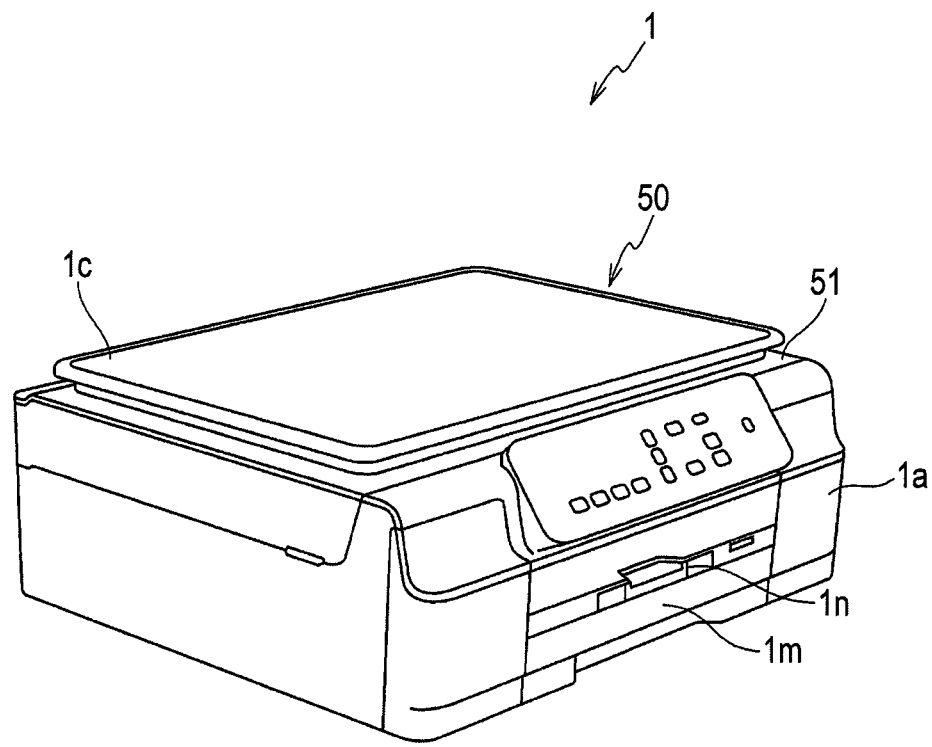
FIG. 2 is a perspective view showing a state in which a cover is closed in the multifunction peripheral shown in FIG. 1.
Figure 2:
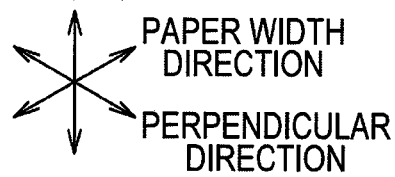

As shown in FIG. 1 and FIG. 2, a multifunction peripheral 1 according to a first embodiment includes a housing 1$a$, a flatbed scanner 50 provided at the upper part of the housing 1*a*, a cover 1*c* attached to the upper part of the housing 1*a* that opens or closes, a paper cassette 1*m* detachably attached to the lower part of the housing 1*a*, and a paper discharge tray 1*n* that opens or closes relative to the housing 1*a*.

Figure 3:
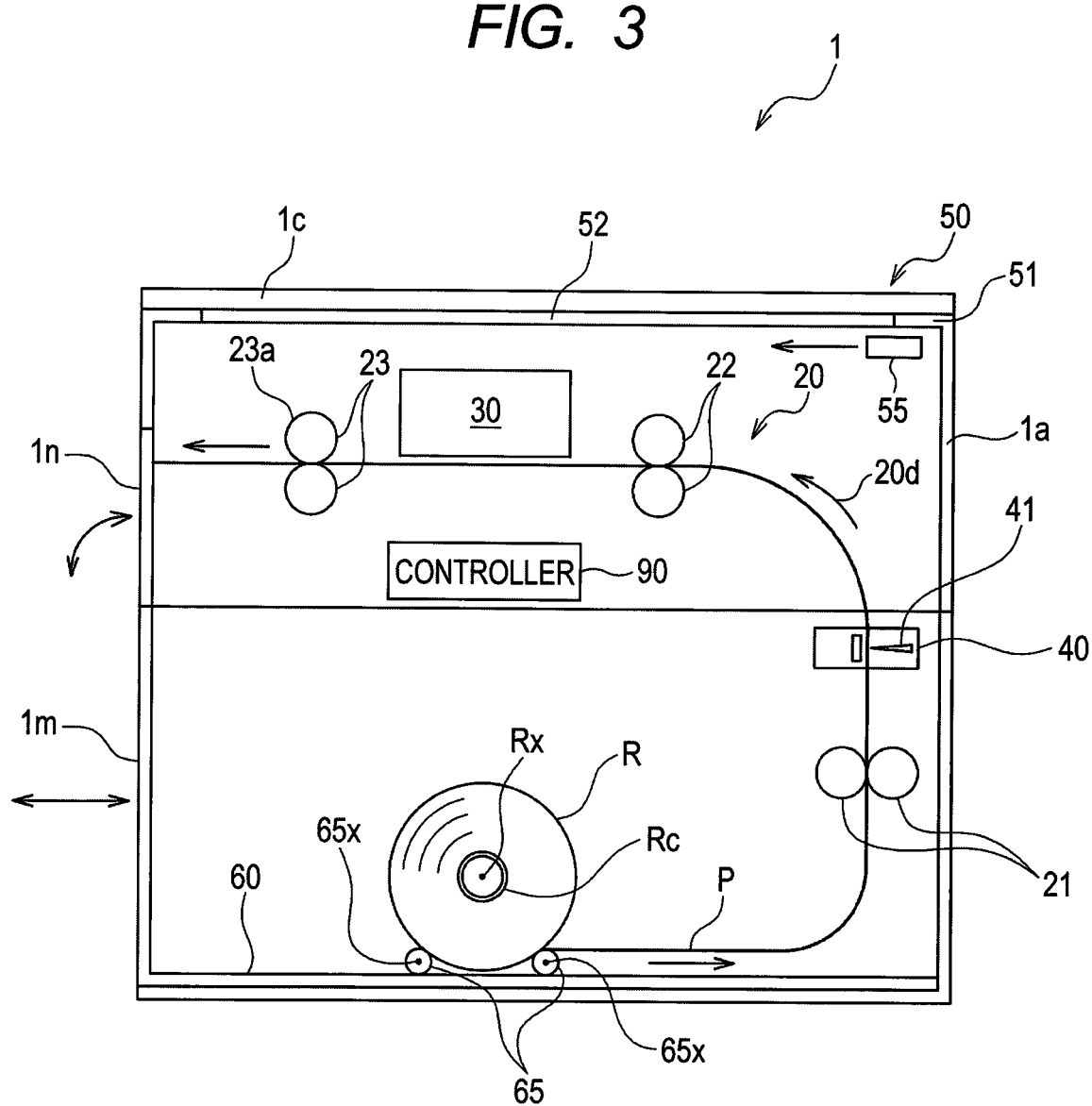
FIG. 3 is a schematic diagram showing the internal structure of a housing of the multifunction peripheral shown in FIG. 1.

As shown in FIG. 3, the paper cassette 1*m* stores therein the rolled paper R. The rolled paper R is obtained by winding a paper P as an example of a recording medium around the outer peripheral surface of a cylindrical core member Rc in a roll-like manner. The rolled paper R is arranged so that the axial direction along the rotation center Rx (the center of the core member Rc) is perpendicular to the vertical direction. The axial direction corresponds to the direction of the width of the paper P (paper width direction).

The paper cassette 1*m* includes a cassette body 60, a pair of rollers 65 that support the rolled paper R in a rotatable manner, the roller pair 21 that conveys the paper P, and a cutting unit 40 that cuts the paper P. The pair of rollers 65, the roller pair 21, and the cutting unit 40 are supported by the cassette body 60.

The pair of rollers 65 are provided at the bottom of the cassette body 60 and are separated from each other in a perpendicular direction perpendicular to the paper width direction and the vertical direction. The pair of rollers 65 contact a part lower than the rotation center Rx in the outer peripheral surface of the rolled paper R and rotate due to the rotation of the rolled paper R with an axial center 65*x* parallel to the paper width direction as the center.

The roller pair 21 extends in the paper width direction above the pair of rollers 65. The roller pair 21 constitutes the conveyance unit 20 described later.

The cutting unit 40 is provided above the roller pair 21. The cutting unit 40 includes a cutter 41 and a cutting motor 40M to drive the cutter 41 (see FIG. 4).

The upper part of the housing 1*a* (above the paper cassette 1*m* in the housing 1*a*) has roller pairs 22 and 23 constituting the conveyance unit 20, a head 30, and a controller 90.

The roller pairs 22 and 23 extend in the paper width direction as in the roller pair 21, respectively. The roller pairs 22 and 23 sandwich the head 30 in the perpendicular direction.

Figure 4:
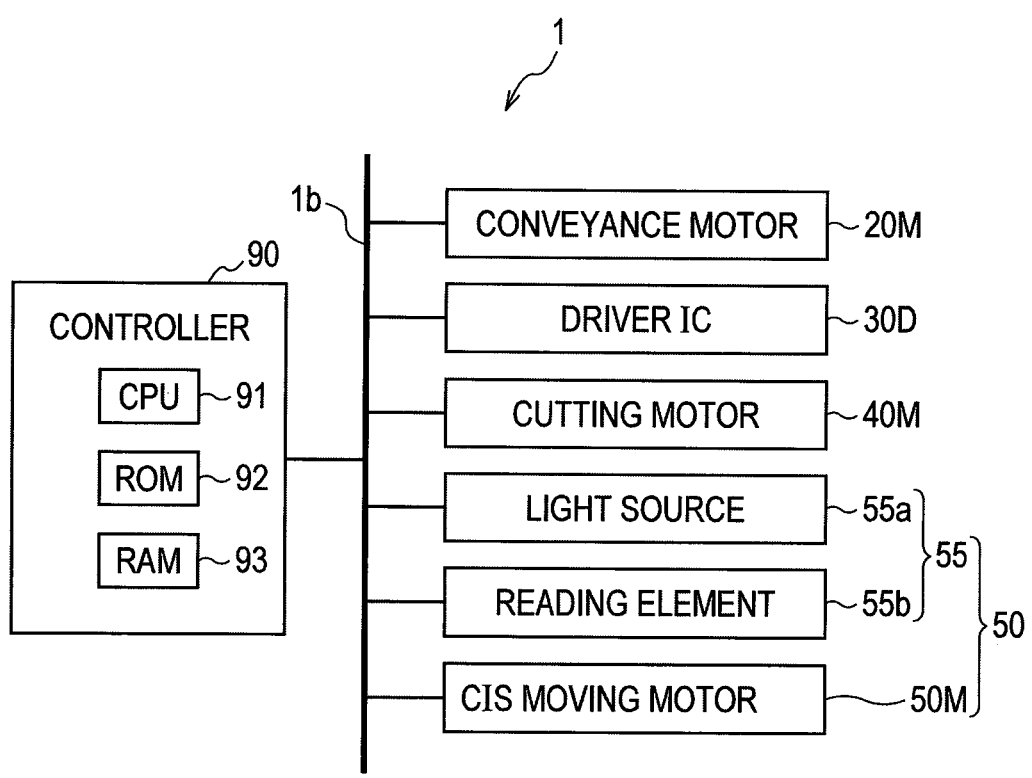
FIG. 4 is a block diagram showing the electrical configuration of the multifunction peripheral shown in FIG. 1.

The conveyance unit 20 includes the roller pairs 21 to 23 and a conveyance motor 20M (see FIG. 4). Each of the roller pairs 21 to 23 is composed of a drive roller rotated by the driving of the conveyance motor 20M and a follow roller that rotates by rotation of the drive roller. Among these rollers, the roller 23*a* of the roller pair 23 (which is provided at the downstream side of the head 30 in the conveyance direction 20*d*) contacting the surface of the paper P (that is, provided at the same side of the head 30 with respect to the paper P) corresponds to a conveyance roller. The conveyance motor 20M is driven by control of the controller 90 and each roller pair 21 to 23 rotates with the paper P sandwiched therebetween, thereby feeding the paper P from the rolled paper R and conveying the paper P in the conveyance direction 20*d*.

The head 30 includes a plurality of nozzles (not shown) formed on the lower surface and a driver IC 30D (see FIG. 4). When the driver IC 30D is driven by the control by the controller 90, ink is ejected through the nozzles and an image is recorded on the paper P conveyed by the conveyance unit 20. The head 30 is an example of a recording unit (print engine) and may be a line-type head in which ink is ejected through the nozzles while the head is in a fixed position, or a serial-type head in which ink is ejected through the nozzles while the head is moving in the paper width direction. Ink is an example of recording agent.

The cutting unit 40 is provided between the roller pairs 21 and 22 in the conveyance direction 20*d* and is provided at the upstream side of the head 30 in the conveyance direction 20*d*.

The paper P fed from the rolled paper R is cut by the cutter 41 by a cutting motor 40M driven by the control by the controller 90. As a result, a rear end in the conveyance direction 20*d* of the paper P (an upstream end in the conveyance direction 20*d*) is formed. The paper P cut by the cutter 41 on which the image is recorded by the head 30 is received by the paper discharge tray 1*n* which is in an open state relative to the housing 1*a*.

The scanner 50 has a document table 51 configured by the upper part of the housing 1*a* and a line sensor 55 placed in the housing 1*a*.

The document table 51 is configured so that a light transmissive plate 52 made of plastic or glass, for example, is fitted therein. The paper P of the reading target is placed on the light transmissive plate 52.

The line sensor 55 is a CIS (Contact Image Sensor)-type (equal magnification optical system), for example, that includes a light source 55*a* (see FIG. 4), a lens (not shown), and a reading element 55*b* (see FIG. 4).

As shown in FIG. 1 and FIG. 2, the cover 1*c* opens or closes relative to the document table 51. When the cover 1*c* is closed, light from the exterior is suppressed from entering the line sensor 55.

When reading an image on the paper P placed on the light transmissive plate 52, the controller 90 drives a CIS moving motor 50M (see FIG. 4) to move the line sensor 55 along the light transmissive plate 52. At this time, light emitted from the light source 55*a* is transmitted through the light transmissive plate 52 and is reflected by the paper P, and the resultant light enters the reading element 55*b* through the lens. The received light is converted by the reading element 55*b* to an electric signal to thereby generate read data of image (data indicating a light receiving amount) to output the said read data to the controller 90.

As shown in FIG. 4, the controller 90 is connected, through an internal bus 1*b*, to the conveyance motor 20M, the driver IC 30D, the cutting motor 40M, the light source 55*a*, the reading element 55*b*, and the CIS moving motor 50M.

The controller 90 has a CPU (Central Processing Unit) 91, a ROM (Read Only Memory) 92, and a RAM (Random Access Memory) 93. The ROM 92 stores therein programs and data to allow the CPU 91 to perform various controls. The RAM 93 temporarily stores data used by the CPU 91 to execute a program. The CPU 91 is an example of a controller. The ROM 92 is an example of a memory (storage). The ROM 92 stores data indicating the diameter of the roller 23*a* as information relating to the rotation cycle of the roller 23*a* used in an adjustment routine described later. The ROM 92 also stores test image data described later, and so on.

Next, the adjustment routine executed by the CPU 91 will be described with reference to FIG. 5. The adjustment routine may be executed at the timing based on an instruction from a user, the timing after the shipment of the multifunction peripheral 1, or the timing at which a particular number of recorded sheets is reached after the adjustment routine is executed previously, for example.

First, the CPU 91 executes test recording processing (S1).

In the test recording processing (S1), the CPU 91 controls the conveyance unit 20 to convey the paper P, controls the head 30 to record, on the paper P, a test image Ti based on the test image data (see FIG. 6), and controls the cutting unit 40 to cut the paper P.

Figure 6:
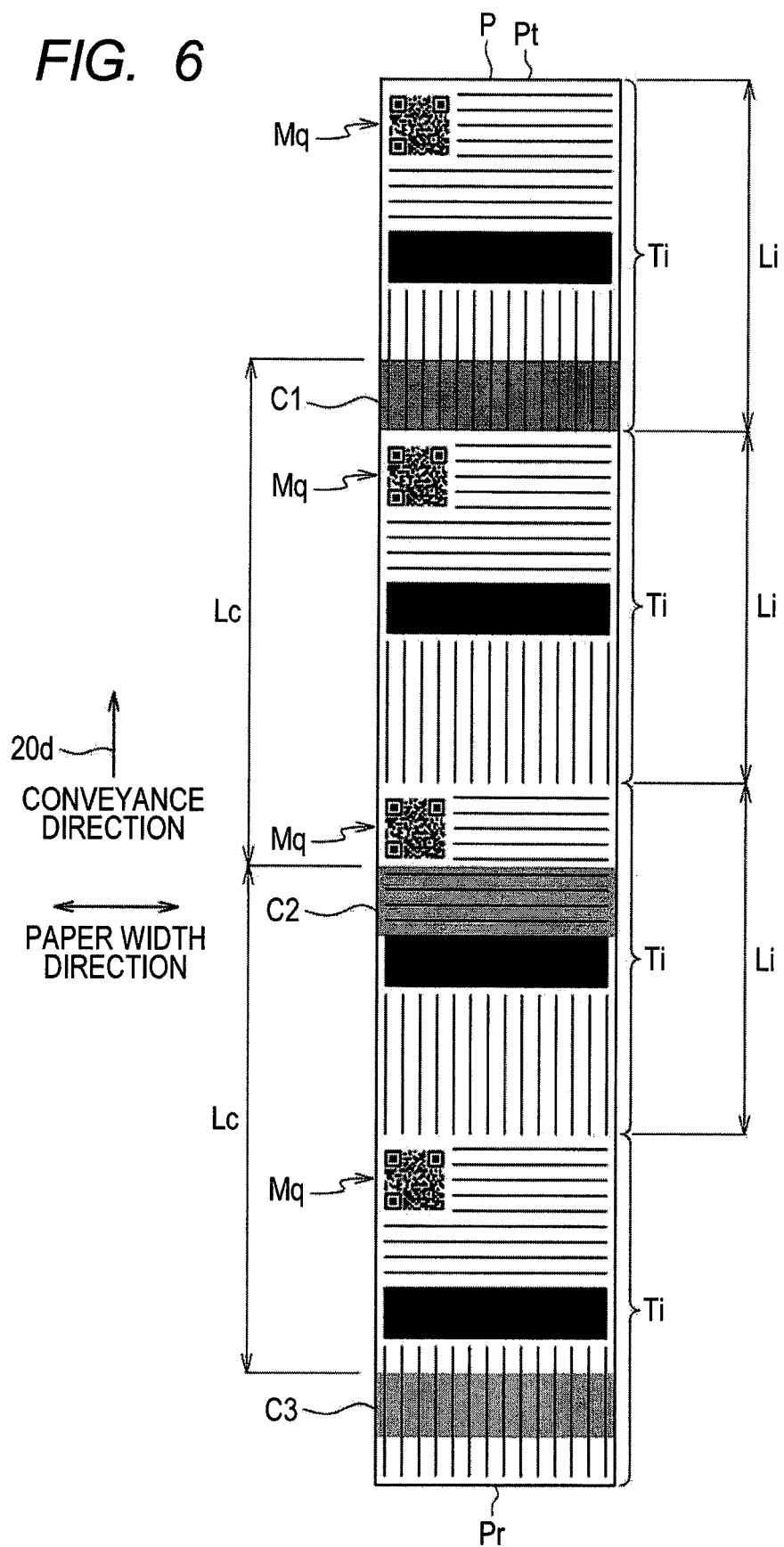
FIG. 6 is a schematic diagram for explaining steps S1 and S2 in FIG. 5.

As shown in FIG. 6, in this embodiment, four test images Ti arranged in the conveyance direction 20*d* are recorded in the test recording processing (S1). The four test images Ti have the same length and pattern in the conveyance direction 20*d*.

The four test images Ti are recorded with a constant recording cycle. Thus, a length Li from the front end of one test image Ti (the downstream end of the conveyance direction 20*d*) to the front end of the test image Ti adjacent to the test image at the downstream side in the conveyance direction 20*d* is constant.

In this embodiment, in the test recording processing (S1), in addition to the four test images Ti, matrix-type two-dimensional codes Mq are recorded, which function as a mark showing the position of the four test images Ti, respectively. In this embodiment, the matrix-type two-dimensional codes Mq are provided at the corners of the front ends of the respective test images Ti.

After the test recording processing (S1), the CPU 91 executes reading processing (S2) to read the test images Ti.

After the test recording processing (S1) and prior to the reading processing (S2), the paper P on which the test images Ti and the matrix-type two-dimensional codes Mq are recorded is placed on the light transmissive plate 52 of the document table 51. For example, the user places, on the light transmissive plate 52, the paper P on which test images Ti and the matrix-type two-dimensional codes Mq have been recorded and which has been received in the paper discharge tray 1*n* in S2. Then, after the user closes the cover 1*c*, the user gives an instruction through an input interface (a switch or a button provided on the housing 1*a*) to allow the CPU 91 to start S2 based on the instruction as a trigger. Alternatively, a movement mechanism (not shown) provided in the multifunction peripheral 1 may move the paper P on which the test images Ti and the matrix-type two-dimensional codes Mq have been recorded and which has been received on the paper discharge tray 1*n* in S1 to a position on the light transmissive plate 52. Then, the CPU 91 may start S2 in response to a placement operation of the paper P on the light transmissive plate 52.

In the reading processing (S2), the CPU 91 controls the light source 55*a* to emit light to the paper P while allowing the line sensor 55 to be driven to move by the CIS moving motor 50M, to thereby allow the reading element 55*b* to generate the read data of the test images Ti and the matrix-type two-dimensional codes Mq (data indicating the light receiving amount).

After the reading processing (S2), the CPU 91 extracts stain data based on the read data which has been generated in the reading processing (S2) and the test image data which has been used in the test recording processing (S1). The stain data indicates stains C1 to C3 caused by the transfer of ink from the roller 23*a* onto the paper P (S3: extraction processing).

The example of FIG. 6 is based on an assumption that ink is attached to a part of the circumferential direction of the outer peripheral surface of the roller 23*a* along the axial direction of the roller 23*a*. The three stains C1 to C3 are attached to the paper P. Among the three stains C1 to C3, the stain C1 at the farthest downstream side in the conveyance direction 20*d* is firstly transferred from the roller 23*a* to the paper P, and has the highest density. Among the three stains C1 to C3, the stain C3 at the farthest upstream side in the conveyance direction 20*d* is lastly transferred from the roller 23*a* to the paper P, and has the lowest density. The three stains C1 to C3 are separated from each other in the conveyance direction 20*d* with the interval corresponding to the rotation cycle of the roller 23*a*. The length Lc in the conveyance direction 20*d* from the front end of the stain C1 (the downstream end in the conveyance direction 20*d*) to the front end of the stain C2 is equal to the length Lc in the conveyance direction 20*d* from the front end of the stain C2 to the front end of the stain C3. The length Lc is derived from the diameter of the roller 23*a* stored in the ROM 92. The rotation cycle of the roller 23*a* is different from the recording cycle of each of the four test images Ti (the rotation cycle is longer than the recording cycle in this embodiment). That is, the length Lc is different from the length Li (the length Lc is longer than the length Li in this embodiment).

In this embodiment, in the extraction processing (S3), RGB (red, green, blue) luminance data is used as the read data generated in the reading processing (S2) and the test image data used in the test recording processing (S1). However, the data used in the extraction processing (S3) is not limited to this, and may be CMYK (cyan, magenta, yellow, black) density data and so on. Specifically, the data used in the extraction processing (S3) is not limited to the read data itself generated in reading processing (S2) or the test image data itself used in the test recording processing (S1), and may be data obtained by the conversion of such data (data obtained by converting the RGB luminance data to CMYK density data, data obtained by converting the CMYK density data to RGB luminance data, and so on).

Figure 7:
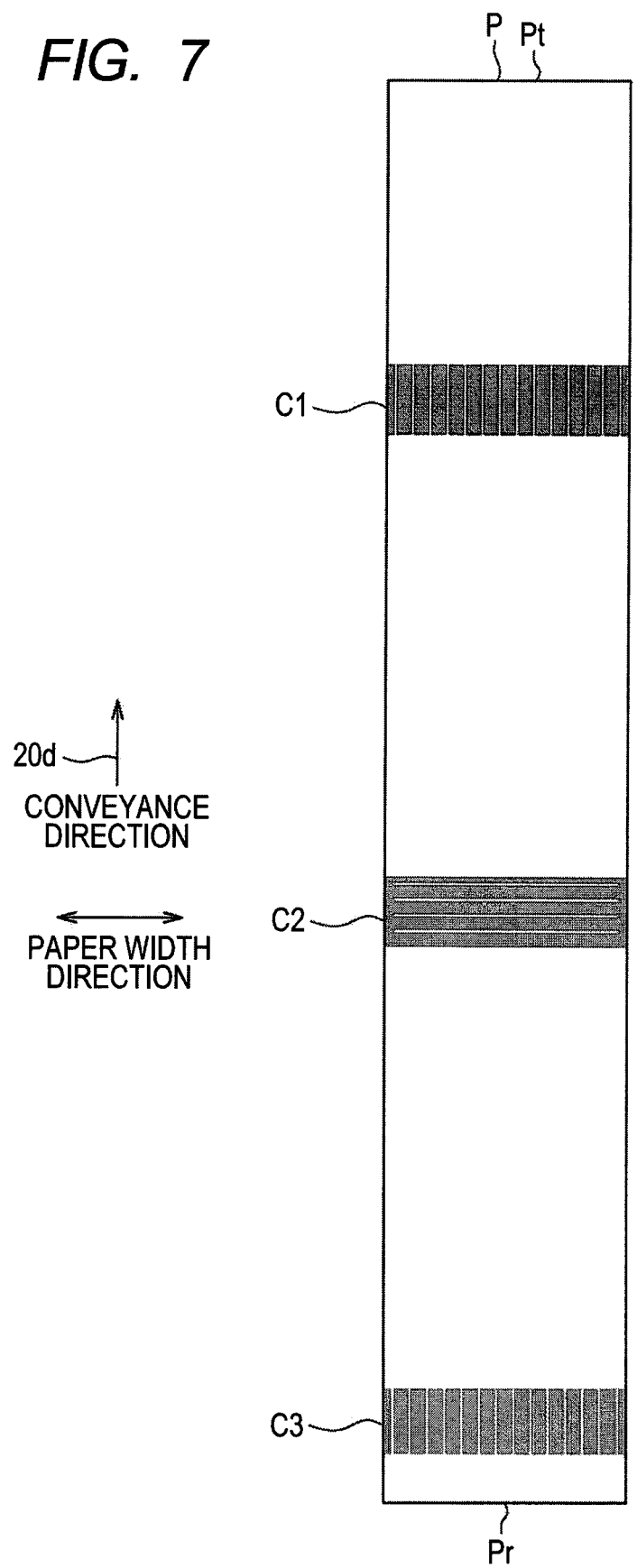
FIG. 7 is a schematic diagram for explaining step S3$a$ in FIG. 5.

In the extraction processing (S3), the CPU 91 firstly removes the test image data used in the test recording processing (S1) from the read data generated in the reading processing (S2) (S3*a*). Specifically, the CPU 91 detects the positions of the respective test images Ti based on the matrix-type two-dimensional codes Mq, and removes, from the read data (see FIG. 6), the data of the respective test images Ti and the data of the respective matrix-type two-dimensional codes Mq based on the detected positions (see FIG. 7). The data shown in FIG. 7 is referred to as "intermediate data". At this time, portions of the respective stains C1 to C3 that overlap the patterns of the test images Ti (a plurality of lines along the conveyance direction 20*d* or the paper width direction) have a lower density because the data of the test images Ti has been removed.

Figure 8:
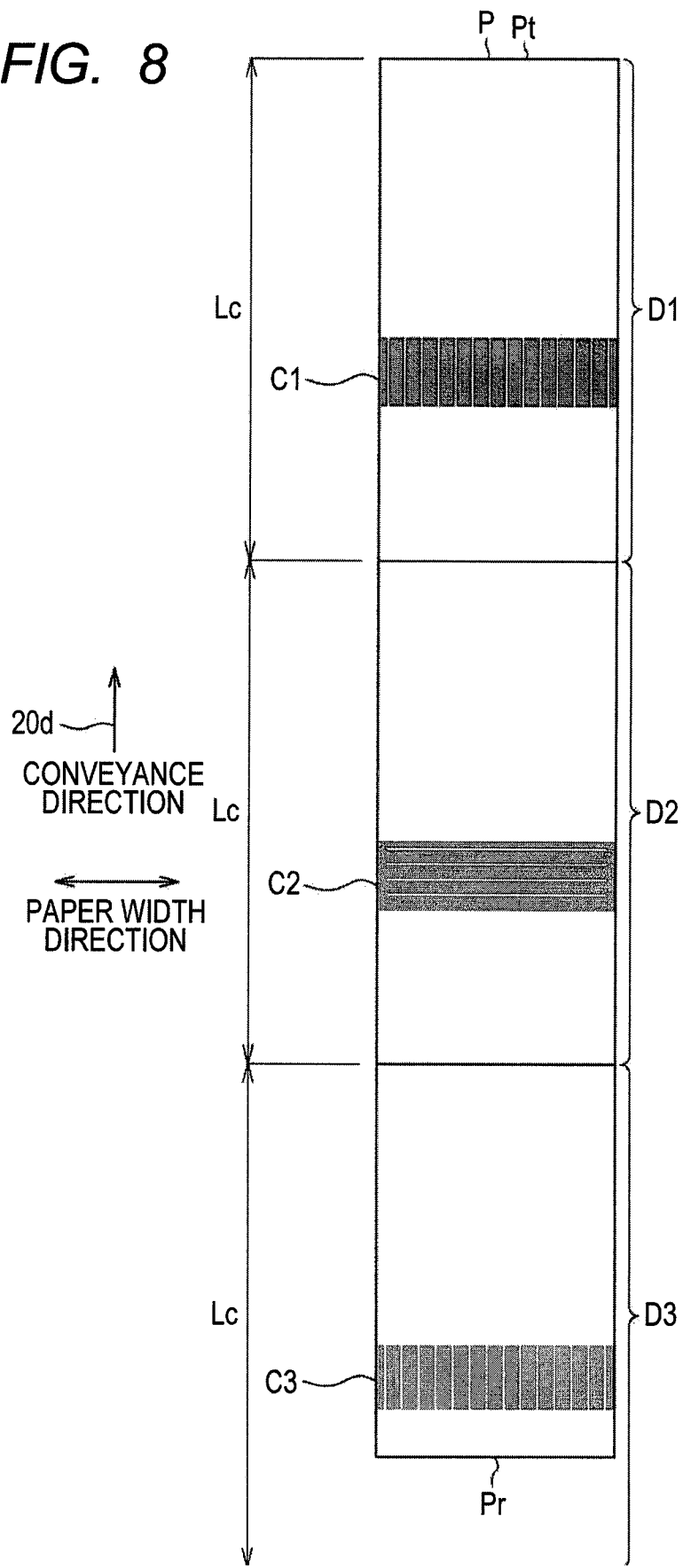
FIG. 8 is a schematic diagram for explaining step S3$b$ in FIG. 5.

As shown in FIG. 8, after S3*a*, the CPU 91 divides the data obtained in S3*a* into division data D1 to D3 having a length Lc of each rotation cycle of the roller 23*a* with a front end Pt (the downstream end of the conveyance direction 20*d*) of the paper P as a starting point, for example (S3*b*). At this time, the CPU 91 divides the data by deriving the above length Lc from the diameter of the roller 23*a* stored in the ROM 92. A part of the division data D3 at the upstream side of a rear end Pr of the paper P in the conveyance direction 20*d* is data of the same color as the surface of the paper P (for example, white).

Figure 9:
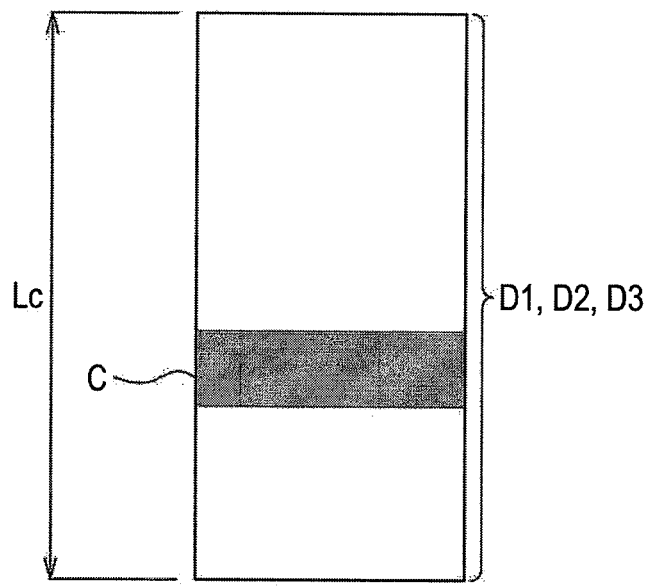
FIG. 9 is a schematic diagram for explaining step S3$c$ in FIG. 5.

As shown in FIG. 9, after S3*b*, the CPU 91 extracts the data of the stain C by superposing the division data D1 to D3 obtained in S3*b* (S3*c*). Regarding the stain C, because the three stains C1 to C3 are superposed, portions (portions having lower density in FIG. 8) of each stain C1 to C3 overlapping the pattern of the test image Ti (a plurality of lines along the conveyance direction 20*d* or the paper width direction) has almost disappeared. The stain C has the same density as the highest density of the three stains C1 to C3.

As described above, the data of the stain C extracted in the extraction processing (S3) is not limited to the density of the stain C and so on, and includes the pattern of the stain C (that is, the position information of the stain C in the read data). More specifically, the pattern of the stain C is a set of information on density (or luminance, brightness, and so on) at each position (each pixel) of the stain C in the read data. That is, the stain C may have uneven density.

After the extraction processing (S3), the CPU 91 generates corrected data by removing the stain data extracted in the extraction processing (S3) from the read data generated in the reading processing (S2) (S4: removal processing). Specifically, the CPU 91 applies, to the read data (see FIG. 6), the data of the stain C (see FIG. 9) in a cyclical manner (for example, based on the front end Pt of the paper P as a starting point and with the length Lc of each rotation cycle of the roller 23*a*), thereby removing the data of the stain C. This consequently removes the stains C1 to C3 from the read data (see FIG. 6).

After the removal processing (S4), the CPU 91 executes the processing (S5) using the corrected data generated in the removal processing (S4). The processing of S5 is arbitrary and may be, for example, the position adjustment of the head 30, the detection of a nozzle having an ejection malfunction, the correction of density unevenness (the adjustment of ejection pulses for each nozzle applied to the driver IC 30D).

After S5, the CPU 91 ends the adjustment routine.

As described above, according to this embodiment, instead of using the read data of the test image Ti as it is (see FIG. 6), the stain data is extracted (S3) and data obtained by removing the stain data (see FIG. 9) from the read data (see FIG. 6) (the corrected data generated in S4) is used to thereby appropriately execute the processing (S5).

The stain caused by the transfer may have an influence on the subsequent processing (S5), even when the stain is a minor one that cannot be visually recognized. Another presumable approach is to convey the paper P until no stain is transferred. However, this approach causes wasteful consumption of the paper P, which is uneconomical. According to this embodiment, by removing the stain data from the read data, the subsequent processing can be executed appropriately (S5) while suppressing the wasteful consumption of the paper P.

The stain data extracted in the extraction processing (S3) includes the pattern of the stain C (see FIG. 7 to FIG. 9). When the stain data extracted in the extraction processing (S3) does not include the pattern of the stain C and includes only the density, luminance, brightness, and so on, the density and so on is lowered overall by removing the stain data from the read data. However, this causes a difficulty in the correction of the density unevenness using the corrected data (the adjustment of the ejection pulse). In contrast, when the stain data includes the pattern of the stain C, the pattern of the stain C is partially removed by removing the stain data from the read data. Thus, the density unevenness is corrected by using the corrected data.

Figure 5:
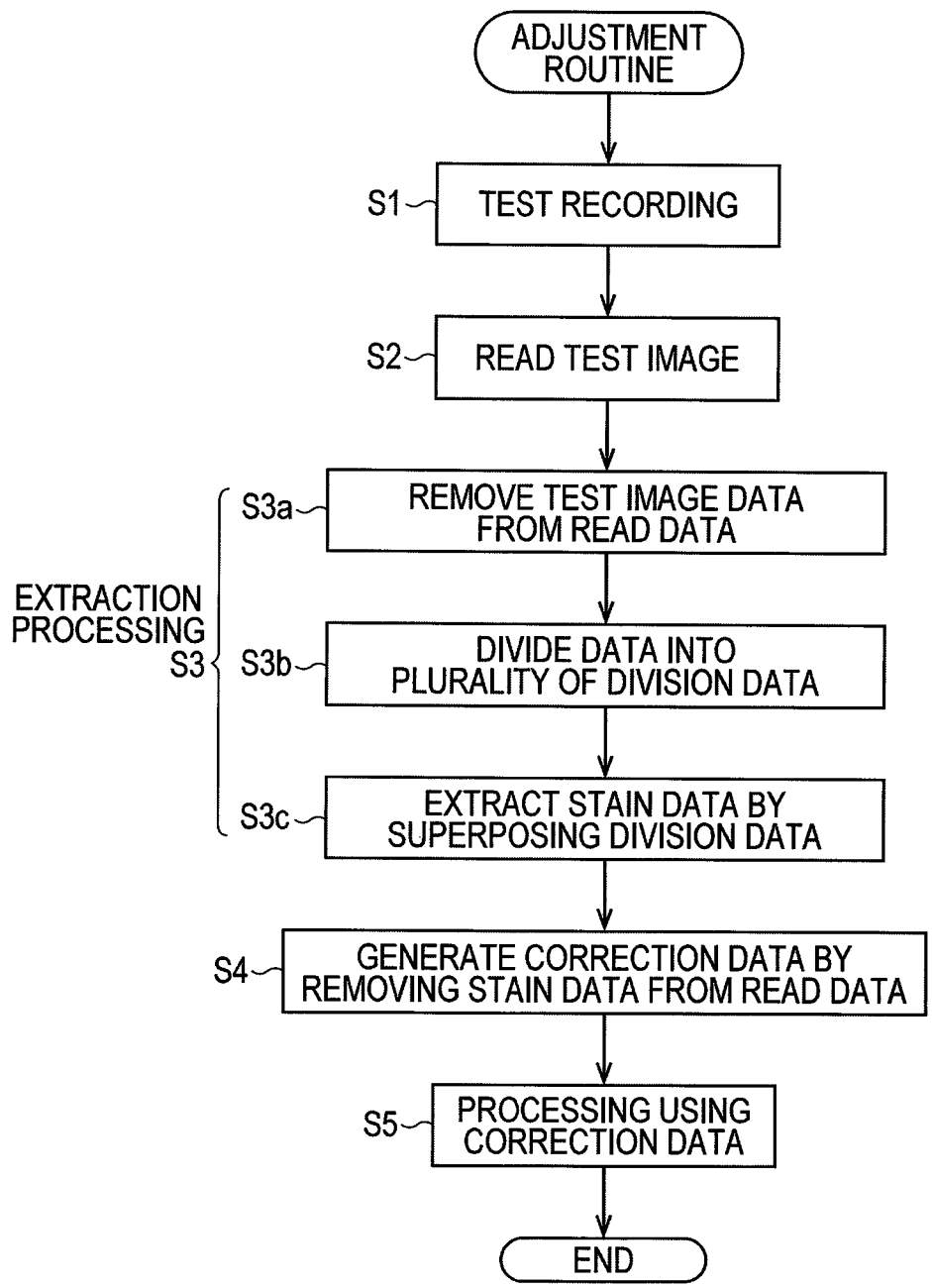
FIG. 5 is a flowchart showing an adjustment routine executed by a CPU of the multifunction peripheral shown in FIG. 1.

As shown in FIG. 5, the CPU 91 removes the test image data from the read data in S3*a* in the extraction processing (S3) to subsequently divide the data to division data D1 to D3 of each rotation cycle of the roller 23*a* (S3*b*) and superpose the division data D1 to D3 and thereby extract the stain data (S3*c*). Thus, the pattern of the stain C can be appropriately extracted.

As shown in FIG. 6, the CPU 91 controls the head 30 to record the four test images Ti in the constant recording cycle in the test recording processing such that the four test images Ti are arranged in the conveyance direction 20*d* (S1). The recording cycle (a cycle corresponding to the length Li) is different from the rotation cycle of the roller 23*a* (a cycle corresponding to the length Lc). When the recording cycle of the test image Ti and the rotation cycle of the roller 23*a* are the same (for example, when the length Li=Lc is satisfied in FIG. 6), the position of each test image Ti is the same (for example, as in the stains C1 and C3 shown in FIG. 7, a part of each stain overlapping the pattern of the test images Ti is the same). Thus, when the division data D1 to D3 (see FIG. 8) are superposed, it is difficult to extract the part (the stain overlapping the test image Ti) as stain data. In contrast, according to this configuration, the recording cycle of the test image Ti and the rotation cycle of the roller 23*a* are different from each other. Thus, the stains in the respective test images Ti are not located at the same position. Thus, by superposing the division data D1 to D3 (see FIG. 8), the stain overlapping the test image Ti can be appropriately extracted as stain data.

As shown in FIG. 6, the CPU 91 in the test recording processing (S1) controls the head 30 to record the four test images Ti and the marks indicating the positions of the respective four test images Ti (matrix-type two-dimensional codes Mq). In the extraction processing (S3), the CPU 91 removes the data of the four test images Ti from the read data based on the marks (matrix-type two-dimensional codes Mq). If there is no mark, due to a printing error (for example, print position deviation) and so on, the test image data may not be removed appropriately. In contrast, according to this configuration, the positions of the four test images Ti are determined based on the marks. The test image data can be removed appropriately even if there is a printing error and so on.

The marks include the matrix-type two-dimensional codes Mq. By using the matrix-type two-dimensional codes Mq as the marks, the position of each of the four test images Ti can be detected accurately even when a printing error occurs in the conveyance direction 20*d* or in the paper width direction.

In the extraction processing (S3), the CPU 91 divides the data obtained in S3*a* based on information on the rotation cycle of the roller 23*a* stored in the ROM 92 (the diameter of the roller 23*a*) into the division data D1 to D3 having the rotation cycle of the roller 23*a* (the circumferential length of the roller 23*a*). When there is no information on the rotation cycle of the roller 23*a*, a presumable approach is to derive the rotation cycle from the stain data included in the read data and perform division of the data. In this case, however, a slight stain cannot be detected and the rotation cycle may not be appropriately derived (or the stain data cannot be appropriately extracted). In contrast, according to this configuration, the information on the rotation cycle of the roller 23*a* (the diameter of the roller 23*a*) is stored in the ROM 92 in advance. By dividing the data based on this information stored in the ROM 92, stain data can be extracted appropriately even when the stain is a slight one.

Second Embodiment

Figure 10:
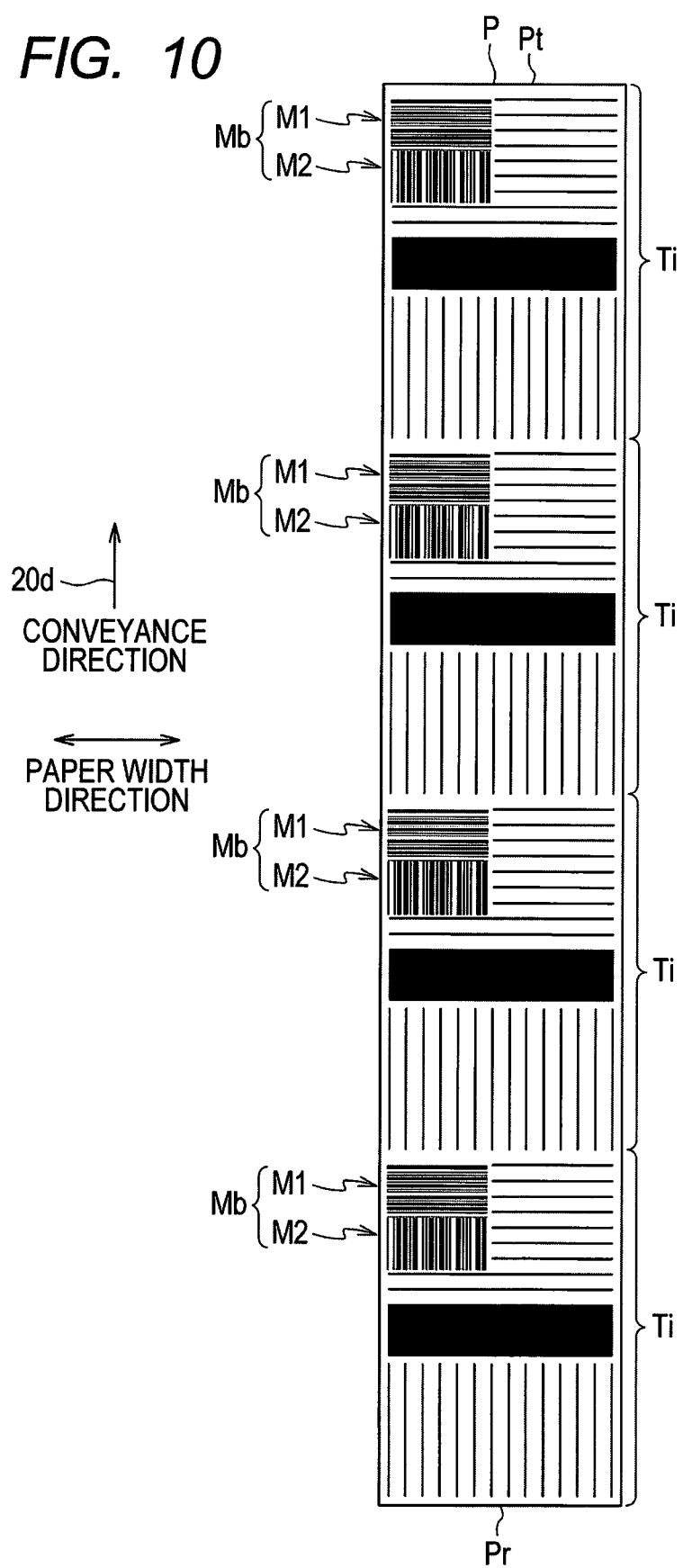
FIG. 10 is a schematic diagram for explaining steps S1 and S2 in FIG. 5 according to a second embodiment of this disclosure.

A second embodiment of this disclosure will be described with reference to FIG. 10.

In the test recording processing (S1), the matrix-type two-dimensional codes Mq are recoded in the first embodiment (FIG. 6). In this embodiment (FIG. 10), barcodes Mb are recorded. The barcode Mb is arranged at the corner of the front end of each test image Ti.

Each barcode Mb is a mark indicating the position of each four test image Ti. Each barcode Mb includes a first barcode M1 having a plurality of bars arranged in the conveyance direction 20*d* and a second barcode M2 having a plurality of bars arranged in the paper width direction.

According to this embodiment, by using the barcode Mb including the first barcode M1 and the second barcode M2 as the mark, each of the four test images Ti can be detected accurately even when there is a printing error in the conveyance direction 20d or in the paper width direction.

Third Embodiment

Figure 11:
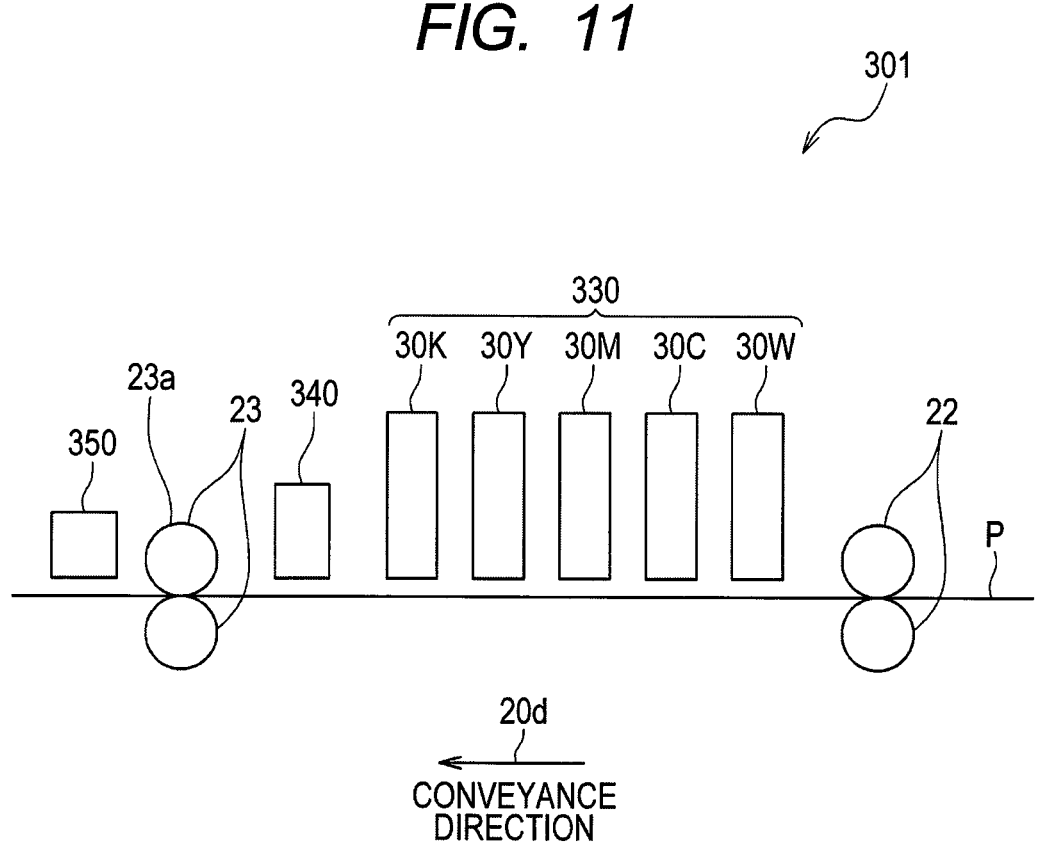
FIG. 11 is a schematic side view showing a multifunction peripheral according to a third embodiment of this disclosure.

A third embodiment of this disclosure will be described with reference to FIG. 11.

This embodiment is the same as the first embodiment except for that a head 330 includes five head units 30W, 30C, 30M, 30Y, and 30K which eject ink of five colors of W (white), C (cyan), M (magenta), Y (yellow), and K (black), respectively; that the ink ejected through the head 330 is ultraviolet (UV) curing ink; that a fixing unit 340 is provided between the head 330 and the roller pair 23; and that a scanner 350 is arranged at the downstream side of the roller pair 23 in the conveyance direction 20d as in the ADF type, not the flatbed type.

In this embodiment, ink is ejected through each head unit 30W, 30C, 30M, 30Y, and 30K of the head 330 onto the paper P. Ultraviolet rays are emitted from the fixing unit 340 to the paper P to thereby cure the ink on the paper P. However, there may be a case where the ink on the paper P is not cured completely by the emission of ultraviolet rays. In this case, the ink on the paper P may be transferred to the roller 23a and this ink is further transferred from the roller 23a to the paper P (a part of the paper P at the upstream side in the conveyance direction 20d or another paper P).

In this embodiment, in the adjustment routine (FIG. 5), after the test recording processing (S1), the reading processing (S2) is performed by the scanner 350 arranged at the downstream side of the roller pair 23 in the conveyance direction 20d, without moving the paper P to the document table.

Although this embodiment is different from the first embodiment in the configurations of the head and the scanner, this embodiment provides similar effects as in the first embodiment by satisfying requirements similar to those of the first embodiment. Specifically, even when uncured ink on the paper P is transferred to the roller 23a and the ink is further transferred from the roller 23a to the paper P and an image on the paper P is read by the scanner 350, the read data of the test image Ti (see FIG. 6) is not directly used and the stain data is extracted (S3). And, by using data (the corrected data generated in S4) obtained by removing the stain data (see FIG. 9) from the read data (see FIG. 6), the processing (S5) is executed appropriately.

<Modification>

While the disclosure has been described in detail with reference to the above aspects thereof, it would be apparent to those skilled in the art that various changes and modifications may be made therein without departing from the scope of the claims.

For example, the stain data may not include a stain pattern and may include only the density, luminance, brightness, and so on. In this case, by removing the stain data from the read data, the overall density and so on can be reduced. Thus, although the processing using corrected data such as the correction of density unevenness (ejection pulse adjustment) may be difficult to perform, the adjustment of the head position and the detection of a nozzle having an ejection malfunction can be performed.

In the above-described embodiment, data indicating the diameter of the roller 23a is stored in the memory as information on the rotation cycle of the conveyance roller. However, the present disclosure is not limited to this. For example, the memory also may store the rotation cycle itself (time) or the circumferential length of the outer peripheral surface of the conveyance roller. In a case where the circumferential length of the outer peripheral surface of the conveyance roller is stored in the memory, the circumferential length is the length Lc, and there is no need for the processing in S3b to derive the length Lc.

In the above-described embodiment, the test image data is removed from the read data in the extraction processing after which this data is divided to a plurality of division data for each rotation cycle of the conveyance roller. The plurality of division data is superposed to extract the stain data. However, the present disclosure is not limited to this. For example, in the extraction processing, the test image data may be removed from the read data after which stain data may be extracted from the data without dividing the data into the division data.

The number of test images as well as the pattern recorded in the test recording processing may be arbitrary. For example, one test image may be recorded in the test recording processing.

The recording cycle of the test image may be the same as the rotation cycle of the conveyance roller.

The mark may be only one of the first barcode M1 and the second barcode M2. The mark is not limited to a matrix-type two-dimensional code or a barcode, and may also be a cross (+) mark and so on.

No mark may be recorded in the test recording processing.

The recording medium is not limited to one wound to have a roll-like shape and may also be a sheet-like medium stacked one by one. The recording medium is not limited to paper and may also be cloth or a resin member, for example.

The recording agent is not limited to ink. For example, the recording agent may be process liquid to provide the aggregation or precipitation of components in ink, toner, and so on. The recording unit is not limited to the liquid ejection method and may also use a laser method, a thermal transfer method, and so on.

According to the control method and program, the test recording processing and the reading processing may be executed by different apparatuses. For example, test recording processing by the liquid ejection apparatus may be followed by reading processing by a spectrophotometric colorimeter (for example, "SpectoroEye" made by X-Rite), and then the liquid ejection apparatus may execute the extraction processing, the removal processing, and so on, based on the read data received from the spectrophotometric colorimeter.

The program according to this disclosure may be distributed by being recorded on a removable storage medium such as a flexible disk or a fixed (non-removable) storage medium such as a hard disk, or may be distributed through a network.

What is claimed is:

1. A multifunction peripheral comprising:
a conveyance roller;
a print engine;
a scanner; and
a controller configured to perform:
driving the conveyance roller to convey a recording medium and controlling the print engine to record, on the recording medium, a test image based on test image data with recording agent;
after recording the test image, controlling the scanner to generate scan data of the test image recorded on the recording medium;
after generating the scan data, extracting stain data based on the scan data and the test image data, the extracting the stain data comprising:

removing the test image data from the scan data to obtain intermediate data;

dividing the intermediate data into a plurality of division data corresponding to each rotation cycle of the conveyance roller; and superposing the plurality of division data to obtain the stain data, wherein the stain data comprises a pattern of a stain;

after extracting the stain data, removing the stain data from the scan data to generate correction data; and executing particular processing by using the correction data, wherein the stain data indicates the stain caused by transfer of the recording agent from the conveyance roller to the recording medium.

2. The multifunction peripheral according to claim 1, wherein the recording the test image includes controlling the print engine to record a plurality of test images at a constant recording cycle such that the plurality of test images are arranged in a conveyance direction in which the recording medium is conveyed by the conveyance roller; and wherein the recording cycle is different from the rotation cycle.

3. The multifunction peripheral according to claim 1, wherein the recording the test image includes controlling the print engine to record a plurality of test images and a plurality of marks, the plurality of marks being indicative of respective positions of the plurality of test images; and wherein the extracting the stain data includes removing the plurality of test images from the scan data based on the plurality of marks.

4. The multifunction peripheral according to claim 3, wherein the plurality of marks includes a matrix-type two-dimensional code.

5. The multifunction peripheral according to claim 3, wherein the plurality of marks includes a first barcode and a second barcode, the first barcode having a plurality of bars arranged in a first direction, the second barcode having a plurality of bars arranged in a second direction different from the first direction.

6. The multifunction peripheral according to claim 1, further comprising a memory configured to store information on the rotation cycle, wherein the extracting the stain data includes dividing the intermediate data into the plurality of division data corresponding to each rotation cycle of the conveyance roller based on the information stored in the memory.

7. The multifunction peripheral according to claim 1, wherein the particular processing includes a position adjustment of a head, detection of a nozzle having an ejection malfunction, and correction of density unevenness.

8. The multifunction peripheral according to claim 1, wherein the pattern of the stain is a set of information on density at each position of the stain in the scan data.

9. A control method of controlling a multifunction peripheral including a conveyance roller, a print engine, and a scanner, the control method comprising:

driving the conveyance roller to convey a recording medium and controlling the print engine to record, on the recording medium, a test image based on test image data with recording agent;

after recording the test image, controlling the scanner to generate scan data of the test image recorded on the recording medium;

after generating the scan data, extracting stain data based on the scan data and the test image data, the extracting the stain data comprising:

removing the test image data from the scan data to obtain intermediate data:

dividing the intermediate data into a plurality of division data corresponding to each rotation cycle of the conveyance roller; and superposing the plurality of division data to obtain the stain data, wherein the stain data comprises a pattern of a stain;

after extracting the stain data, removing the stain data from the scan data to generate correction data; and executing particular processing by using the correction data, wherein the stain data indicates the stain caused by transfer of the recording agent from the conveyance roller to the recording medium.

10. The control method according to claim 9, wherein the recording the test image includes controlling the print engine to record a plurality of test images at a constant recording cycle such that the plurality of test images are arranged in a conveyance direction in which the recording medium is conveyed by the conveyance roller; and wherein the recording cycle is different from the rotation cycle.

11. The control method according to claim 9, wherein the recording the test image includes controlling the print engine to record a plurality of test images and a plurality of marks, the plurality of marks being indicative of respective positions of the plurality of test images; and wherein the extracting the stain data includes removing the plurality of test images from the scan data based on the plurality of marks.

12. The control method according to claim 11, wherein the plurality of marks includes a matrix-type two-dimensional code.

13. The control method according to claim 11, wherein the plurality of marks includes a first barcode and a second barcode, the first barcode having a plurality of bars arranged in a first direction, the second barcode having a plurality of bars arranged in a second direction different from the first direction.

14. The control method according to claim 9, wherein the extracting the stain data includes dividing the intermediate data into the plurality of division data corresponding to each rotation cycle of the conveyance roller based on information on the rotation cycle stored in a memory of the multifunction peripheral.

15. A non-transitory computer-readable storage medium storing a program including computer-readable instructions for a multifunction peripheral including a conveyance roller, a print engine, and a scanner, the computer-readable instructions, when executed by a controller of the multifunction peripheral, causing the multifunction peripheral to perform:

driving the conveyance roller to convey a recording medium and controlling the print engine to record, on the recording medium, a test image based on test image data with recording agent;

after recording the test image, controlling the scanner to generate scan data of the test image recorded on the recording medium;

after generating the scan data, extracting stain data based on the scan data and the test image data, the extracting the stain data comprising:

removing the test image data from the scan data to obtain intermediate data:

dividing the intermediate data into a plurality of division data corresponding to each rotation cycle of the conveyance roller; and superposing the plurality of division data to obtain the stain data, wherein the stain data comprises a pattern of a stain;

after extracting the stain data, removing the stain data from the scan data to generate correction data; and executing particular processing by using the correction data, wherein the stain data indicates the stain caused by transfer of the recording agent from the conveyance roller to the recording medium.

\* \* \* \* \*